United States Patent [19]

Smith

[11] 4,043,374

[45] Aug. 23, 1977

[54] WHEEL RIM ASSEMBLY AND METHOD FOR DEMOUNTING A TIRE THEREFROM

[75] Inventor: Duane R. Smith, Oswego, Ill.

[73] Assignee: Caterpillar Tractor Co., Peoria, Ill.

[21] Appl. No.: 641,461

[22] Filed: Dec. 17, 1975

[51] Int. Cl.² .................... B60B 25/00; B60C 5/00
[52] U.S. Cl. .................................. 152/405; 152/404; 301/35 R; 301/63 D
[58] Field of Search ............... 152/396, 402, 403, 404, 152/405, 414; 301/63 D, 35 R, 11 CD, 97, 98, 99, 103, 39 T

[56] References Cited

U.S. PATENT DOCUMENTS

| 823,093 | 6/1906 | Williams | 152/405 |
| 1,953,267 | 4/1934 | Sanders | 301/35 R |
| 3,006,692 | 10/1961 | Schubert | 152/405 |
| 3,063,488 | 11/1962 | Bennett et al. | 152/405 |
| 3,831,658 | 8/1974 | Poplawski | 152/396 |
| 3,877,504 | 4/1975 | Grawey et al. | 152/396 |
| 3,882,919 | 5/1975 | Sons, Jr. et al. | 152/405 |

Primary Examiner—Drayton E. Hoffman
Attorney, Agent, or Firm—Phillips, Moore, Weissenberger, Lempio & Majestic

[57] ABSTRACT

A wheel rim assembly comprises a pair of annular rim sections each having a rim flange secured on an outboard end thereof for retaining an air-inflated tire thereon. A pair of back-to-back mounting flanges extend radially inwardly from inboard ends of the rim sections and are bolted together. One of the mounting flanges preferably extends radially inwardly beyond the other mounting flange and is adapted to be bolted to an axle hub of a vehicle. At least two latch means are mounted on peripheral portions of the rim sections to straddle the same for releasably attaching them together. Carrying forth the method of this invention, the tire is first deflated whereby a tool may be inserted through an opening formed through one of the rim sections to release the latch means to provide for separation of the rim sections upon release of the bolts.

24 Claims, 4 Drawing Figures

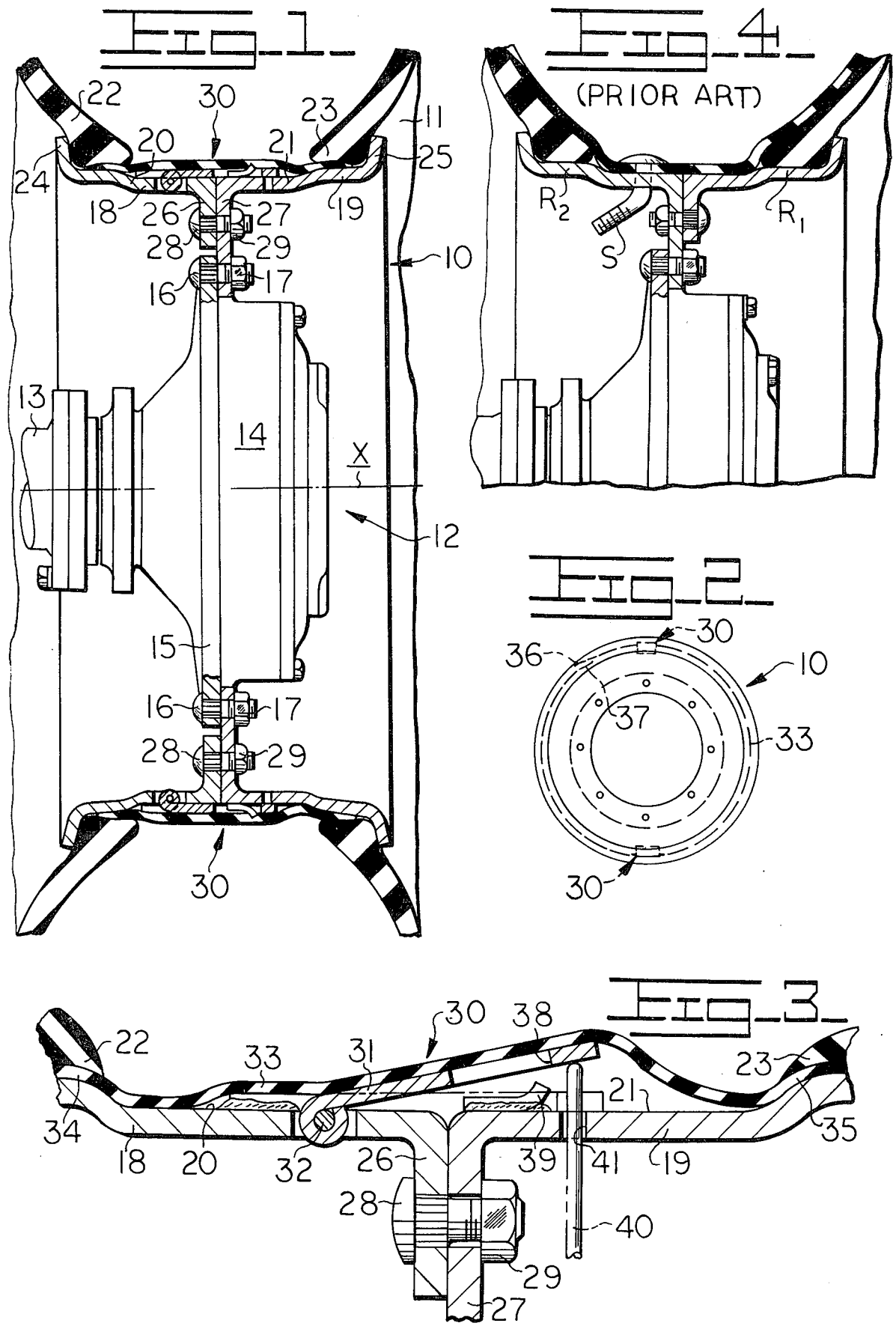

WHEEL RIM ASSEMBLY AND METHOD FOR DEMOUNTING A TIRE THEREFROM

BACKGROUND OF THE INVENTION

A conventional two-part rim assembly for tires normally comprises a pair of rim sections having mounting flanges thereof releasably attached together by a plurality of circumferentially disposed bolts. Such a rim assembly is adapted for use on large construction vehicles wherein tire sizes dictate the need therefor. In particular, the two-part rim construction facilitates demounting a tire therefrom by merely releasing the bolts in contrast to other conventional rim assemblies wherein the tire beads must be stretched over one of the rim flanges of a rim assembly. One problem arising with respect to such a two-part rim assembly is one of assuring substantial deflation of the tire prior to detachment of the rim sections from each other.

SUMMARY OF THIS INVENTION

An object of this invention is to provide an improved rim assembly adapted to expeditiously demount a tire therefrom safely and efficiently. The rim assembly comprises a pair of annular rim sections defining coaxially aligned peripheral portions mounting an air-inflated tire thereon. A rim flange is secured on an outboard end of each of the rim sections to retain the tire in axial position on the rim assembly and a mounting flange is secured on an inboard end of each of the rim sections.

The mounting flanges are releasably attached together by fastening means, such as bolts, and at least two latch means are provided on the rim sections to straddle the coaxially aligned peripheral portions thereof. The latch means normally releasably attaches the rim sections together under the influence of air pressure retained in the tire and is releasable upon deflation of the tire. Carrying forth the method of this invention, the tire is first deflated and then a work tool may be inserted through an opening formed through one of the rim sections to engage and release the latch means whereby the rim sections may be separated.

BRIEF DESCRIPTION OF THE DRAWING

Other objects of this invention will become apparent from the following description and accompanying drawing wherein:

FIG. 1 is a cross sectional view of a rim assembly, attached to a final drive of a vehicle, having a latch means of this invention mounted thereon along with a partially illustrated air-inflated tire;

FIG. 2 is a reduced side elevational view of the rim assembly to illustrate the relative circumferential disposition of a pair of the latch means thereon;

FIG. 3 is an enlarged sectional view of one of the latch means; and

FIG. 4 is a partial cross sectional view of a prior art rim assembly, illustrating its attachment to a final drive of a vehicle.

DETAILED DESCRIPTION

FIG. 1 illustrates a rim assembly 10 having an air-inflated tubeless tire 11 mounted thereon and attached to a final drive 12 of a construction vehicle for rotation about a longitudinal axis X thereof. The final drive may comprise a drive axle 13 having a mounting hub 14 secured on an outboard end thereof. A mounting flange 15 of the hub has the rim assembly releasably attached thereto by a plurality of circumferentially disposed releasable fastening means, shown as constituting bolts 16 and nuts 17.

The rim assembly comprises a pair of annular first and second rim sections 18 and 19 defining co-axially aligned peripheral portions 20 and 21, respectively, for mounting beads 22 and 23 of the tire thereon. A pair of annular rim flanges 24 and 25 are secured on outboard ends of the first and second rim sections, respectively, to extend radially outwardly therefrom and away from axis X to abut outboard sides of the tire beads to retain the tire on the rim assembly.

A pair of mounting flanges 26 and 27 are integrally secured on inboard ends of first and second rim sections 18 and 19, respectively, to extend radially inwardly therefrom and towards rotational axis X. Fastening means, preferably comprising a plurality of circumferentially disposed bolts 28 and nuts 29, releasably attach the mounting flanges together in back-to-back relationship. It should be noted in FIG. 1 that second mounting flange 27 extends radially inwardly beyond first mounting flange 26 and is solely attached to mounting flange 15 of axle housing 14 by bolts 16 and nuts 17.

The above arrangement provides a safety feature whereby inadvertent detachment of rim sections 18 and 19 while tire 11 remains pressurized would not subject a workman to harm. In particular, inadvertent release of bolts 28 and hereinafter described latch means 30 would permit rim section 18, disposed on an inboard side of hub 14, to be displaced inwardly towards the vehicle in a harmless manner.

Such arrangement may be contrasted with a prior art arrangement illustrated in FIG. 4 wherein an outboard rim section $R_1$ would tend to separate outwardly away from the vehicle, relative to an inboard rim section $R_2$. It should be further noted that FIG. 4 illustrates a standard valve stem S of the type that may be employed with the tire and rim assembly illustrated in FIGS. 1-3.

A pair of latch means 30 of this invention are mounted on the rim assembly for normally attaching rim sections 18 and 19 together under the influence of air pressure retained in the tire and for permitting release thereof upon deflation of the tire. In the preferred embodiment of this invention, a pair of such latch means are circumferentially disposed on the rim assembly in diametric opposition relative to each other (FIG. 2). Although in certain applications a single latch means may suffice, two or more equally spaced latch means (such as the illustrated diametrically opposed set) are preferred to dynamically balance the rim assembly.

Referring to FIG. 3, each latch means 30 preferably comprises a latch 31 pivotally mounted on rim section 18 by a pivot pin 32 and an annular elastomeric liner 33. Although in certain applications the latch could be employed without the liner, such liner is preferably employed therewith to impose an air-induced closing force on the latch. Axial ends 34 and 35 of the liner are preferably adhesively bonded to the rim sections and are compressed between the rim sections and tire beads 22 and 23. As shown in FIG. 2, circumferential ends 36 and 37 of the liner overlap and are bonded together by a suitable adhesive.

Latch 31 straddles coaxially aligned peripheral portions 20 and 21 of the rim sections in substantially flush relationship therewith and has an opening 38 formed therethrough. As shown by full lines in FIG. 1 and phantom lines in FIG. 3, opening 38 normally engages an upturned lug 39 which is welded or otherwise secured on peripheral portion 21 of rim section 19. The lug functions as a shear block to normally prevent the rim sections from moving axially relative to each other, even though bolts 28 may be released therefrom. Flexible liner 33 thus functions as a closing means to normally bias the latch downwardly over the lug in its latched position thereon, under the influence of pressurized air in the tire. When the latch means of this invention is employed in conjunction with a tube-tire of the type illustrated in FIG. 4, the tube thereof will normally function as a closing means to hold the latch in its closed position on the lug.

Tire 11 may be demounted from rim assembly 10 in the following manner. Upon substantial depressurization of the tire via valve means, not shown, a suitable rod-like tool 40 (FIG. 3) must be inserted through an opening 41 formed through rim section 19 which exposes a free end of latch 31. The tool will thus engage the latch to pivot and release it from lug 39 prior to separation of the rim sections upon release of bolts 28.

Such arrangement provides an obvious safety feature in that should tire 11 remain pressurized, a workman would be unable to flex liner 33 to its full-line position shown in FIG. 3 to release the latch from the lug. However, when the air pressure in the air is brought down to a predetermined level, the latch may be uncoupled from the lug to thus permit detachment of the rim sections.

I claim:

1. A rim assembly having an air-inflated tire mounted thereon and disposed for rotation about a longitudinal axis thereof, said rim assembly comprising
a pair of annular first and second rim sections defining co-axially aligned peripheral portions mounting said tire thereon,
a rim flange secured on an outboard end of each of said first and second rim sections to extend radially outwardly therefrom and away from said axis to retain said tire on said rim assembly,
first and second mounting flanges secured on an inboard end of said first and second rim sections, respectively, to extend radially inwardly therefrom and towards said axis,
fastening means releasably attaching said first and second mounting flanges together, and
latch means mounted on and straddling the co-axially aligned peripheral portions of said first and second rim sections for normally releasably attaching them together under the influence of air pressure in said tire and releasable upon inflation of said tire to a predetermined level of air pressure therein, said latch means disposed on the outer periphery of said rim assembly and interiorly of said tire to be directly acted upon by air pressure in the said tire.

2. The rim assembly of claim 1 wherein at least two of said latch means are circumferentially disposed on said first and second rim sections.

3. The rim assembly of claim 2 wherein a pair of said latch means are circumferentially disposed on said first and second rim sections in diametric opposition relative to each other.

4. The rim assembly of claim 1 wherein said latch means comprises a latch pivotally mounted on said first rim section and having an opening formed therein and a lug secured to said second rim section and disposed in said opening for preventing said first and second rim sections from moving axially relative to each other.

5. The rim assembly of claim 4 wherein said latch comprises a flat plate disposed substantially flush on the peripheral portions of said first and second rim sections.

6. The rim assembly of claim 4 wherein said latch means further comprises closing means for normally biasing said latch over said lug into its normally latched position thereon under the influence of air pressure in said tire.

7. The rim assembly of claim 6 wherein said closing means comprises a flexible liner disposed over said latch.

8. The rim assembly of claim 7 wherein axial ends of said liner are secured to the peripheral portions of said first and second rim sections and are compressed between a bead of said tire and a respective one of said first and second rim sections.

9. The rim assembly of claim 7 wherein said liner is annular and wherein circumferential ends thereof are overlapped and secured together.

10. The rim assembly of claim 7 wherein said liner constitutes an elastomeric sheet material.

11. The rim assembly of claim 4 further comprising means forming an opening through said second rim section to expose a free end of said latch whereby upon insertion of a tool through said opening said latch may be raised to unlatched position from said lug.

12. The rim assembly of claim 1 wherein said second mounting flange extends radially inwardly beyond said first mounting flange to define an annular mounting portion adapted to mount said rim assembly on an axle hub of a vehicle.

13. The rim assembly of claim 12 further comprising a final drive axle having a hub secured on an outboard end thereof and releasably fastening means solely releasably attaching the annular mounting portion of said second rim section on said hub.

14. The rim assembly of claim 13 wherein said first rim section is disposed on an inboard side of said hub and said second rim section is disposed on an outboard side thereof.

15. In a rim assembly of the type adapted to have a tire mounted thereon, said wheel rim assembly comprising a pair of first and second rim sections defining co-axially aligned peripheral portions adapted to mount a tire thereon and having a pair of mounting flanges releasably attached together, the invention comprising latch means mounted on the outer periphery of said rim assembly and straddling the co-axially aligned peripheral portions of said first and second rim sections for releasably attaching them together whereby upon mounting of a tire on said rim assembly air pressure in said tire will act directly upon said latch means.

16. The rim assembly of claim 15 wherein a pair of said latch means are circumferentially disposed on said first and second rim sections in diametric opposition relative to each other.

17. The rim assembly of claim 16 wherein said latch means comprises a latch pivotally mounted on said first rim section and having an opening formed therein and a lug secured to said second rim section and disposed in said opening for preventing said first and second rim sections from moving axially relative to each other.

18. The rim assembly of claim 17 wherein said latch means further comprises closing means for normally biasing said latch over said lug into its normally latched postion thereon.

19. The rim assembly of claim 18 wherein said closing means comprises a flexible liner disposed over said latch.

20. The rim assembly of claim 19 wherein said liner is annular, circumferential ends of said liner are overlapped and secured together and axial ends of said liner are secured to the peripheral portions of said first and second rim sections.

21. The rim assembly of claim 19 wherein said liner constitutes an elastomeric sheet material.

22. The rim assembly of claim 17 further comprising means forming an opening through said second rim section to expose a free end of said latch whereby upon insertion of a tool through said opening said latch may be raised to unlatched position from said lug.

23. A method for demounting an air-inflated tire from a rim assembly comprising a pair of annular rim sections normally attached together by a plurality of circumferentially disposed and releasable bolts and also by at least one releasable latch means disposed on the outer periphery of said rim assembly and straddling peripheral portions of said rim sections to normally prevent relative axial movement thereof comprising the steps of deflating said tire to expel air pressure therefrom acting directly on said latch means,
releasing said bolts, and
releasing said latch means.

24. The method of claim 23 wherein the step of releasing said latch means comprises the steps of inserting a tool through an opening formed through one of said rim sections and engaging and releasing said latch means.

* * * * *